Feb. 2, 1971 N. D. DESHLER ET AL 3,560,966
ELECTROMAGNETICALLY OPERATED DISPLAY DEVICE
Filed Jan. 29, 1969 3 Sheets-Sheet 3
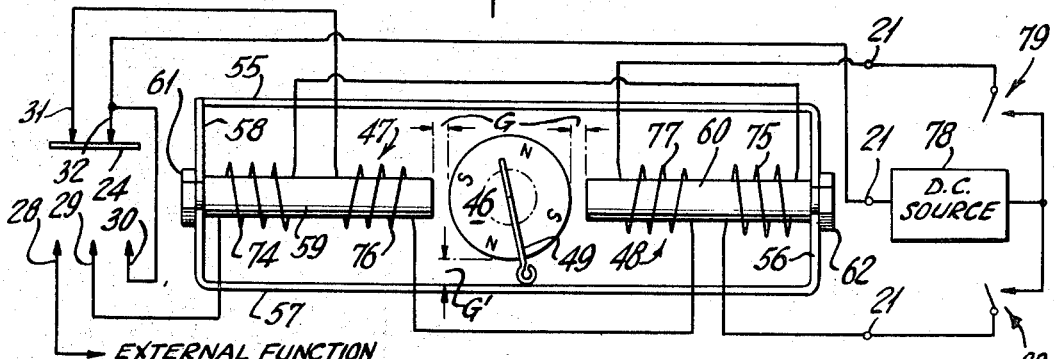
Fig. 14.
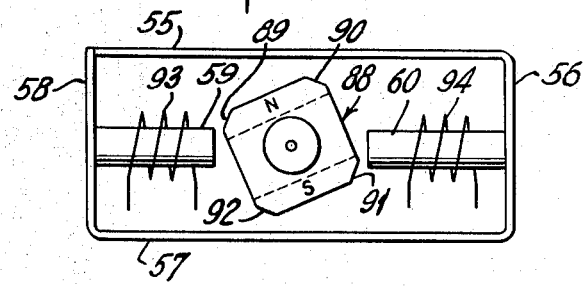
Fig. 15.
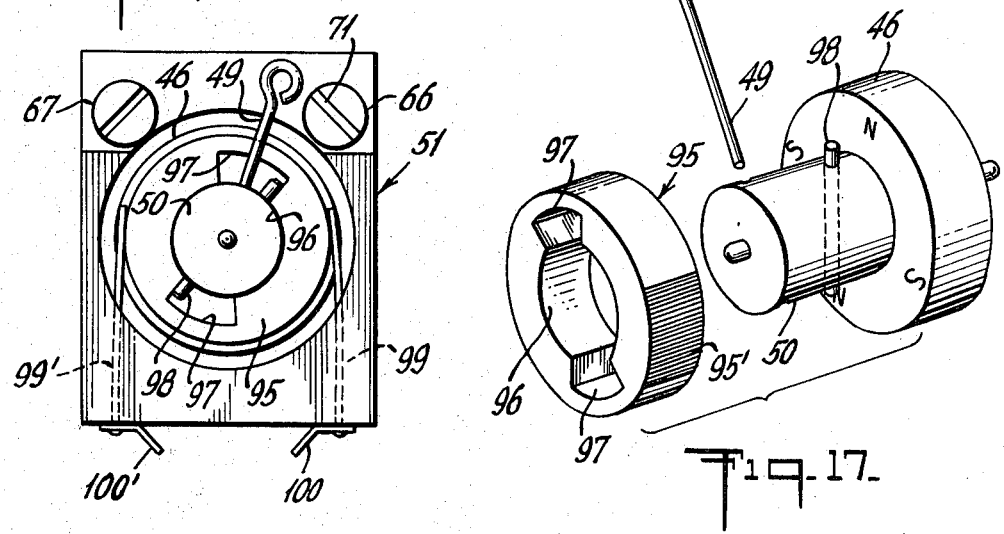
Fig. 16.
Fig. 17.
INVENTORS
GERELD L. TAWNEY
NORMAN D. DESHLER
BY
Sandoe, Hopgood & Calimafde
ATTORNEYS

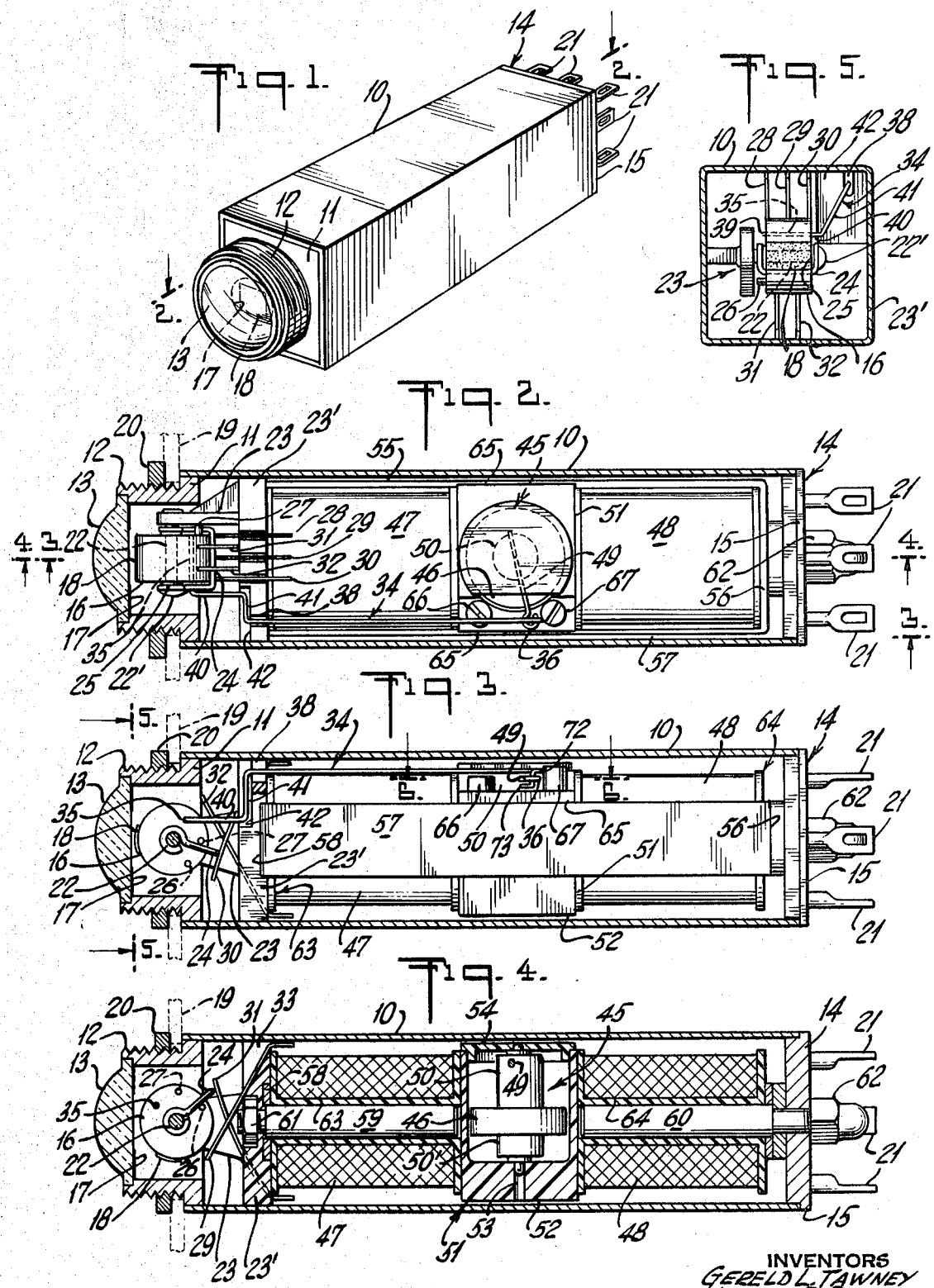

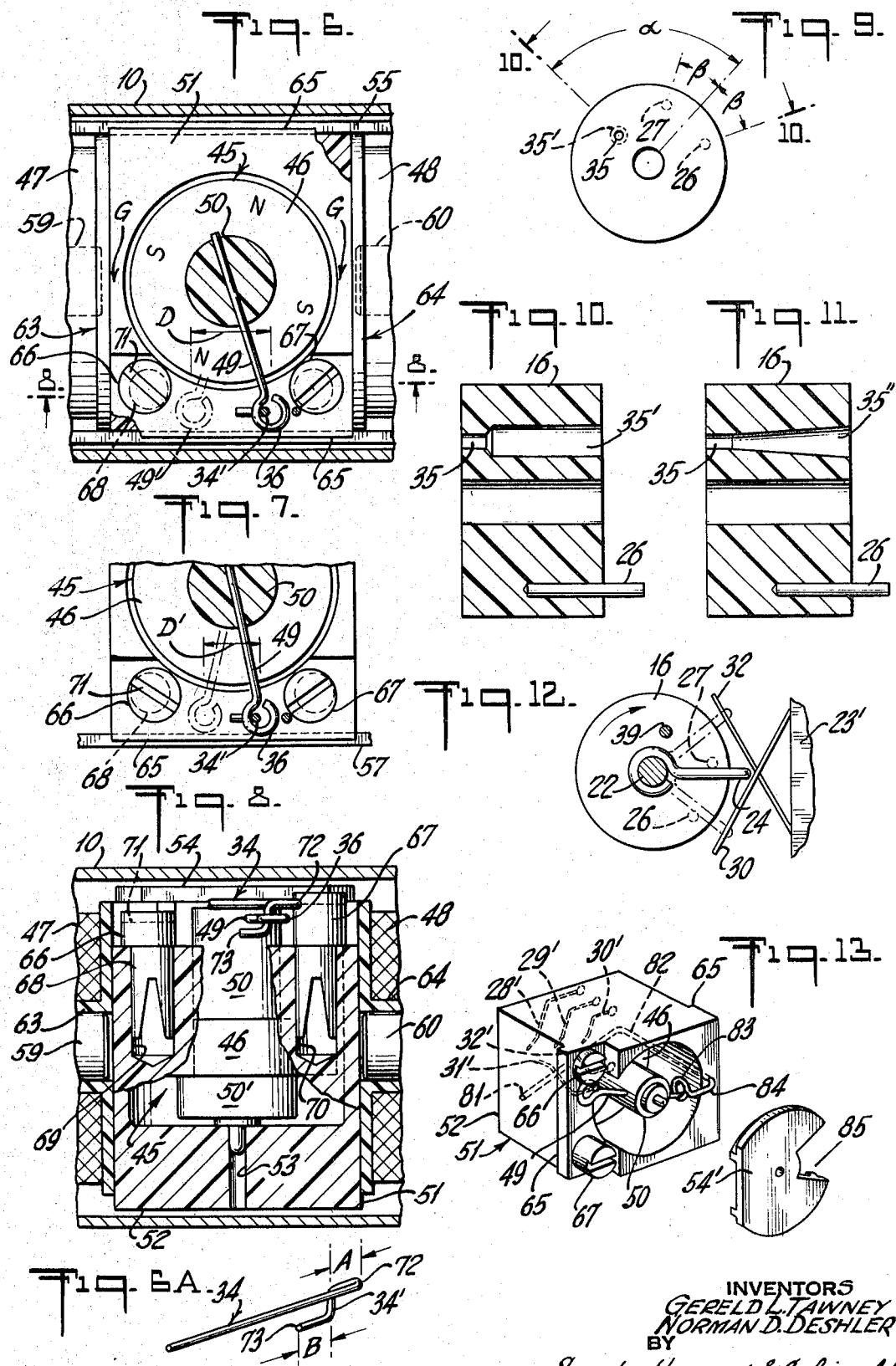

United States Patent Office 3,560,966
Patented Feb. 2, 1971

3,560,966
ELECTROMAGNETICALLY OPERATED DISPLAY DEVICE
Norman D. Deshler, Belvedere, N.J., and Gereld L. Tawney, Los Altos Hills, Calif., assignors to Nytronics, Inc., Pelham, Manor, N.Y., a corporation of Delaware
Filed Jan. 29, 1969, Ser. No. 826,033
Int. Cl. G08b 5/24
U.S. Cl. 340—373
21 Claims

ABSTRACT OF THE DISCLOSURE

The invention contemplates a display device in which a display member and a permanent-magnet drive member are independently mounted for pivotal oscillation on spaced frame-based axes. Frame-based magnetic core and excitation windings are pulse-actuated to shift the drive member to one or to the other of its two angularly spaced at-rest positions. The polarity of permanent magnetism is such, in terms of the angularly spaced limits of drive-member movement, that the drive member is self-retained at its limit position, without need for excitation. A switch device tracks drive-member movement to reverse the winding excitation connections, thus conditioning the display device for response to the next excitation pulse. For any given actuation, starting resistance is minimized by using lost-motion connection techniques to link the driven member in operative relation with the display member and with the switch device, the arrangement being such that, whatever the direction of actuation, the lost-motion must first be traversed before effective driving torques are imparted to the display member or to the switch device.

RELAY CONSTRUCTION

The invention relates to an improved electromagnetically actuated display device for indicating the condition of an electric circuit, in response to an electrical pulse which changes the condition of the circuit.

Prior devices of the character indicated have exhibited various deficiencies, including the need for power to hold a given indication, undue susceptibility to vibration, excessive bulk and mechanical complexity, inadequate reliability of operation, and excessive power required to change indications.

It is an object of the invention to provide such a display device which will avoid or substantially reduce the foregoing deficiencies.

A specific object is to provide an improved electromagnetic display device which relies on permanently magnetized elements to retain a given indicated-display condition.

Another specific object is to incorporate improved self-switching polarity-reversing elements in a device of the character indicated.

Still another object is to meet the above objects with a structure involving a minimum of mass in the moving parts thereof, and a minimum of parts.

A further object is to meet the above objects with a structure in which magnetic forces are symmetrically developed about a magnetic-rotor axis, both for holding and for driving purposes.

A general object is to provide such an indicator of elemental simplicity, ruggedness, and reliability, and in which static friction of movable parts is held to a minimum.

Other objects and various further features of novelty and invention will be pointed out or will occur to those skilled in the art from a reading of the following specification in conjunction with the accompanying drawings. In said drawings, which show various forms of the invention:

FIG. 1 is a perspective view of a display device of the invention, within its container-type housing;
FIG. 2 is a longitudinal sectional view in the plane 2—2 of FIG. 1;
FIG. 3 s a longitudinal sectional view in the plane 3—3 of FIG. 2;
FIG. 4 is a longitudinal sectional view generally in the alignment 4—4 of FIG. 2, but illustrating a shifted or different indicator position within the mechanism;
FIG. 5 is a sectional view in the plane 5—5 of FIG. 3;
FIG. 6 is an enlarged fragmentary sectional view in the plane 6—6 of FIG. 3;
FIG. 6A is an enlarged fragmentary perspective view of the driven end of a connecting link in the mechanism of the invention;
FIG. 7 is a view similar to FIG. 6 to illustrate a different adjusted relation of parts;
FIG. 8 is an enlarged fragmentary view of the central part of FIG. 3, partly broken-away and in section in the plane 8—8 of FIG. 6;
FIG. 9 is a diagram to illustrate angular relationships for a switch element of the indicator of the invention;
FIGS. 10 and 11 are enlarged longitudinal sectional views of alternative indicator heads in the mechanism of the invention, taken along the line 10—10 of FIG. 9;
FIG. 12 is an enlarged fragmentary side elevation of switch elements which also appear in FIGS. 2 to 5;
FIG. 13 is an exploded perspective view of actuator and switching mechanism which represents a first alternative for that shown in FIGS. 2 to 5;
FIG. 14 is a simplified electric circuit diagram involving the electromagnetic display device of the invention;
FIG. 15 is a simplified diagram of a modified magnetic circuit arrangement;
FIG. 16 is a view in elevation, with cover removed, to illustrate a second alternative actuator and switching mechanism; and
FIG. 17 is an exploded view of rotor-mounted parts in the mechanism of FIG. 16.

Briefly stated, the invention contemplates a display device in which a display member and a permanent-magnet drive member are independently mounted for pivotal oscillation on spaced frame-based axes. Frame-based magnetic core and excitation windings are pulse-actuated to shift the drive member to one or to the other of its two angularly spaced at-rest positions. The polarity of permanent magnetism is such, in terms of the angularly spaced limits of drive-member movement, that the drive member is self-retained at its limit position, without need for excitation. A switch device tracks drive-member movement to reverse the winding excitation connections, thus conditioning the display device for response to the next excitation pulse. For any given actuation, starting resistance is minimized by using lost-motion connection techniques to link the driven member in operative relation with the display member and with the switch device, the arrangement being such that, whatever the direction of actuation, the lost-motion must first be traversed before effective driving torques are imparted to the display member or to the switch device.

Referring to the drawings, the invention is shown in application to a unit-handling structure contained within an elongated rectangular prismatic body or container 10 having a first or closed end 11 formed with a threaded tubular projection 12 which mounts a viewing lens 13, and a second or open end through which an assembled chassis of indicator mechanism is longitudinally insertable. The base 14 of the chassis includes a peripheral flange or shoulder 15 which seats against the open end of housing 10 to precisely position a rotary display member or indicator 16 directly behind the central opening in a suitable mask 17, which may be a deposited coating on the back surface of lens 13; a heavy line 18 on the periphery of display member 16 will be understood to suggest a first (e.g., black) indicating area behind mask 17 for one angular position (FIGS. 2 and 3) and a second (e.g., white) indicating area behind mask 17 for the other angular position (FIG. 4). When thus assembled, the base 14 is suitably sealed to the housing 10, as by solder, and the complete unit is mounted to an opening in a panel 19 by a clamp nut 20. Thus mounted, terminal lugs as at 21, project rearwardly from the base 14, for wiring to a source and other circuit elements.

The display member 16 is shown as a cylindrical element pivotally mounted on a stud 22 at the projecting end of a standard or bracket 23 forming part of the frame or chassis. Bracket 23 is integrally formed with a base 23' conforming to the interior section of housing 10, but with a slight clearance, for ease of insertion. Both the bracket 23 and the display member are preferably of molded self-lubricating plastic, such as the Teflon-filled polycarbonate thermoplasict known as Lexan. Thus, with stud 22 firmly anchored in bracket 23, the torsional resistance of display member 16 on its pivot is held to a minimum, and no further lubricating provision is needed.

In the form shown, switching means, including polarity-reversing elements, rely upon a movable element or bail 24 having spaced arms pivoted on the axis of pin 22; specifically, the bail arms pivot on small axially projecting hubs 25 integrally formed with the display member 16, so that permanent self-lubrication characterizes bail support, and a head 22' on stud 22 retains display member 16 on the bracket 23. Fixed off-axis pins 26–27 are carried at angularly spaced locations on display member 16 to interfere with the otherwise free pivotal motion of bail 24 with respect to member 16, thus determining limits of the angularly lost-motion relation of the parts 16–24.

The bail 24 serves as a shorting bar to electrically connect three contacts or wiper arms 28–29–30 (to the exclusion of further contacts or wiper arms 31–32) for one bail position (FIGS. 2, 3), and to electrically connect arms 31–32 (to the exclusion of arms 28–29–30) for the other bail position (FIG. 4). All contacts or wiper arms are of the same nature, each being the cantilevered end of a compliant wire or rod secured in its own groove or slot, as at 33 for arm 30 in FIG. 4. The base ends of all wiper arms are bent rearwardly, for electrical connection to wiring, not shown in FIGS. 2 to 5 but schematically indicated in FIG. 14.

Shifting displacement is imparted to indicator 16, and necessarily also to switching means 24, by a link connection 34 between an off-axis point (or hole) 35 on member 16 and an off-axis point (or hole) 36 on pivoted drive mechanism 45, shown centrally located in the insert-chassis assembly. Connection 34 is preferably a stiff elongated wire or rod, as of beryllium copper, longitudinally guided in a self-lubricating slot 38 in base 23' and having a transversely bent end 30 (FIG. 5) received in the off-axis opening or connection 35 in member 16. Orthogonally related bends or offsets 40–41 connect the end 39 to the main elongated body of link 34. The offset 41 extends transverse to the elongation axis of link 34 and closely clears a recessed face 42 of base 23' at one end (FIGS. 2 and 3) of its normal displacement; it will be understood that the offset 41 and face 42 coact as a limit stop to prevent possible damage to the drive mechanism in the event of inadvertent rotational contact with member 16 during chassis assembly. Preferably also, the bent end 39 of link 34 primarily engages the off-axis location 35 on member 16 in essentially a single radial plane, thus minimizing any tendency to bind in the bore 35; alternative configurations to effect this purpose are shown as a straight counterbore 35' in FIG. 10, and as a flaring conical counterbore 35" in FIG. 11.

FIG. 9 illustrates the general relation between the off-axis connection 35 and the two lost-motion limits 26–27 for driving the bail 24. For efficiency of force transmission, the angle α between the radial location of connection 35 and the mid-point between stops 26–27 is essentially a right angle. The centers of stops 26–27 are at an angle β of about 25 degrees either side of this mid-point, so that for the proportions shown, an angular lost motion of about 30 degrees characterizes the drive connection of the display head 16 to bail 24.

The pivoted drive mechanism is generally designated 45. It comprises stator and rotor element, including a permanently magnetized member 46 coacting with excitation means 47–48 symmetrically disposed on diametrically opposite sides of the axis of rotor 46. Excitation pulses to the means 47–48 are operative to displace a rotor-output crank or arm 49 from one to the other of its two positions, or in the reverse direction, depending on the nature of the excitation; and the off-axis pivot connection 36 will be seen as merely the looped end of a bent stiff wire, embedded in an elongated flanged hub 50 on which the rotor element 46 is carried and bonded, being located against the hub flange 50'. The off-axis connection radius at 36 preferably exceeds that at 35, so that angular motion of desired extent may be transmitted to display member 16, in spite of the presence of lost motion in the drive chain from rotor 46. The stator comprises a hollow rectangular prismatic body 51, closed at one end 52 except for a central bore 53 to provide a pivot bearing for the projecting reduced end of hub 50; at the other end, stator 51 is closed by a cap 54, internally flanged to locate on the bore of body 51 and centrally formed to provide a pivot bearing for the other projecting reduced end of hub 50. Preferably, the hub 50 and stator parts 51–54 are of injection-molded self-lubricating plastic, such as Lexan, previously mentioned. The annular magnet element 45 is a sintered iron-oxide ceramic having permanent magnetic poles located at 90-degree spacings, alternately North and South, circumferentially about its axis.

Remaining parts of the chassis structure are connected by and based on a permeable, metallic rectangular frame, completely surrounding the entire assembly and forming magnetic-circuit functions. This frame is shown as a single steel strap, comprising a first elongated leg or course 55, a first short leg or end 56, a second elongated leg or course 57, and a second short leg or closing end 58. Like cylindrical core elements 59–60 (FIG. 4), which may also be of permeable material, such as a suitable steel, project into adjacency with the stator body 51 and are located in central apertures in the short legs 56–58; core element 59 is formed with a reduced threaded end secured by nut 61 to the base 23' of the indicator-support structure, and the reduced threaded end of core element 60 is secured by nut 62 to the flanged chassis base 14. The windings 47–58 are on like bobbins 63–64 which locate on the cores 59–60 and which centrally locate and position the stator body 51 with respect to the end legs 56–58 of the magnetic circuit. The stator 51, complete with the described rotor elements, will be seen as a subassembly which is transversely insertable between adjacent flanges of bobbins 63–64 and adjacent pole faces of the cores 59–60, insertion being complete as raised shoulders 65 of body 51 locate against the frame legs 55–57 (see FIGS. 3 and 6).

In FIG. 6, the driving movement of rotor 46 is seen to effect a longitudinal displacement D to the connecting link 34 to the indicator head 16, between limit stops afforded by spaced posts 66–67. These stops are critical in determining each of the two at-rest orientations of the magnet poles on rotor 46 with respect to adjacent pole faces of cores 59–60, and so we provide for limited angular adjustment of the effective stop positions. In the form shown, stop 66 is an enlarged eccentric head on a cylindrical body 68, frictionally held in a bore 69 in the stator 51; a forked end formation of body 68 provides a means of radially outwardly stressing the fit of stop 66 in the bore 69. Similar features characterize the stop 67 and its fit in another bore 70 in stator 51. In both cases, a slot, as at 71, provides ready screw-driver access for eccentric stop adjustment, ranging from a maximum effective distance D (FIG. 6) to a minimum effective distance D' (FIG. 7).

For any given driving actuation of the indicator and switch elements, starting-torque requirements on rotor 46 are minimized by requiring arm 49 to traverse a degree of lost motion before it is called upon to displace the link 34. In the form shown, this lost motion is established by a radial clearance at the bent portion 34' (FIGS. 6 and 7) of the wire of link 34, amounting to substantially the wire diameter where it (34') passes through the eye or off-axis connecting point 36 of arm 49. Also, reliance is placed on suitably projecting stop abutments or offsets 72–73, respectively extending like but oppositely directed distances A–B with respect to the arm-connecting link portion 34' (FIG. 6A). As will be seen in FIGS. 6 and 7, the effective offset distances A (B) are such as to assure that arm 49 will torsionally load offset 72 into direct abutment with stop 67 for the right-hand positions shown in solid lines in FIGS. 6 and 7, and similarly to assure arm 49 torsionally loading offset 73 into direct abutment with stop 66 for the left-hand positions shown in phantom outline in FIGS. 6 and 7; the torsional loading is attributable to the torque reaction from permanent-magnet attraction between like opposed rotor poles and adjacent pole faces of cores 59–60, as will now be more fully explained.

Referring to FIG. 6, the right-hand at-rest position of drive arm 49 holds the like opposed permanent-magnet South poles in proximity to the pole faces of cores 59–60, at like gaps G. For the case of the South pole near core 59, a polarized circuit is established across the gap to core 59, through core 59, branching radially outward from the base connection to short leg 58, back through the long legs 55–57, and to a return to North rotor poles over the leakage gap in the longitudinal central region of the magnetic circuit. Because the stop setting at 67 prevents the South poles from achieving dead-center alignment with the ole-face centers of cores 59–60, there is a residual torque available to hold arm 49 against stop 67, via the link portions 34'–72. A similar flux distribution and orientation characterizes the right-hand end of the system, through core 60, end leg 56, and the remainder of the elongated legs 55–57, with leakage at the central gap to North poles.

In the other at-rest position 49' of link 49, the rotor 46 will have been displaced something less than 90 degrees (approximately 75°) with the liked opposed permanent-magnet North poles in proximity to, but short of dead-center alignment with, the pole faces of cores 59–60. The polarized magnetic circuits will be as already described but with opposite polarity, creating a residual holding torque to retain the shifted at-rest arm position 49'. It will be noted that, regardless of the at-rest position of arm 49, the residual holding torque due to the described action will be symmetrically applied between the rotor and its non-rotated support structure, so that torques are independent of and do not promote any net radial-load reaction at the rotor pivot bearings.

The driven displacement action of rotor 46 will be described in connection with the schematic diagram of FIG. 14, wherein the electrical windings are seen to comprise two sets of coils linked symmetrically to each of the cores 59–60; all coils have the same number of turns, there being two coils on each bobbin 63 (64). The polarity of the coil windings is such as to produce like magnetic poles at the pole faces adjacent rotor 46. Thus, for one direction of driving excitation (displacement), a first coil 74 and a second coil 75 are series-connected and symmetrically coupled to the respective cores 59–60; and for the opposite direction of excitation, a third coil 76 and a fourth coil 77 are series-connected with opposite polarity of flux coupling to the cores 59–60. For the switched position shown, i.e., bail 24 connecting the contacts or wiper arms 31–32, an external pulsing circuit is completed to source 78, as through a key 79 to coils 76–77. The polarity of current flow and of the connections of windings 76–77 is such as to present South polarity at each of the core pole faces, thus instantly repelling the adjacent South poles of rotor 46 to produce a shifting displacement torque (clockwise, in FIGS. 2, 6, 7, 14). With such displacement there is, of course, a superposed attraction to the nearest North-pole locations of rotor 46, so that by the time a given key pulse at 79 has ended, the rotor has achieved its other at-rest position, with the permanent North poles establising the hold-in action already described. It will be understood that for the indicated repulsion and attraction described for a clockwise rotor displacement, the flux path runs from South polarity at the core pole faces, through the cores, branching to legs 58–55–57 (56–55–57), and returning via the leakage region designated by the like gaps G' which are shown to exceed the smaller pole-face gaps G.

It will be understood that the described clockwise driving shift of rotor 46 and its arm 49 is operative not only to shift the indicator 16 to display its changed position but also to shift the switch arm or bail 24 to establish reversed excitation-winding connections (of contacts 28–29–30), in readiness for a next shift pulse, as developed by a second key 80. Operation of key 80 applies source 78 to the other like excitation coils 74–75 in such polarity as to present relatively strong North-pole action at the pole faces, to create counterclockwise rotor-reaction torque by repelling the North poles and attracting the South poles of rotor 46 back into the position shown in full in FIGS. 2, 6, 7, 14. As soon as rotor 46 has achieved this position, the described residual hold-in action is re-established, without need for further electrical excitation.

It will be appreciated that contact 28 of the switch mechanism is not necessary to reversing-switch action but is merely provided to illustrate the incorporation of an optional external function, as for example one suitable for operating an external control or lamp circuit via an independent one of the terminal lug points 21.

In FIG. 13, we show an alternative switch mechanism to provide the described switch functions in the central chassis region, i.e., based on the stator body 51. In place of the bail 24, a contact arm 81 is formed as the bent end of a stiff wire or rod having a central length 82 which is pivotally journalled in a small bore extending the depth of stator 51. At its other end, a loop 83 is formed at the end of a short follower arm 84, and the root end of driving arm 49 is extended rearwardly to engage the loop 83 with angular lost motion; this lost motion is again preferably in the order of the wire thickness in its extent. The cap 54' is as already described except for a local cut out at 85, to enable limited rocking displacement of arm 84 as it tracks the driving motion of arm 49. Such displacement of arm 84 sweeps the switch-contact arm 81 between a first position, shorting the contacts 28'–29'–30', and a second position, shorting the contacts 31'–32', corresponding respectively to the switch action already described for contacts 28 to 32 in FIGS. 2 to 5 and 14. In FIG. 13, a circle at the base of each contact 28' to 32' will be understood to suggest its independent mounting on the closed end 52 (back surface) of stator 51; each such contact is a stiffly resilient bent wire or rod extending in close spaced relation to the back surface 52 and yieldably riding up on arm 81 as it swings into engagement therewith.

FIG. 15 is a simplified illustration of a modified magnetic circuit arrangement in which the rotor 88 is permanently magnetized with but one pair of opposed poles. These poles are located along opposite faces of a generally square configuration having truncated corners 89–90–91–92, and the limit-stop arrangement determining the two angular spaced at-rest positions of rotor 88 is not shown but will be understood to be as already described for rotor 46. Thus, for the at-rest position shown, and in the absence of winding excitation, North corner 89 is residually attracted to the adjacent pole face of core 59 and, in the same manner, the opposite South corner 91 is equally attracted to the adjacent pole face of core 60, the at-rest flux paths being unidirectional through the rotor and the cores, returning by divided paths through the upper frame legs 55 and the lower frame leg 57, respectively. A pulsed excitation of winding 93 may be operative to override the at-rest polarized flux and to establish transient North polarization at the pole face of core 59 and transient South polarization at the pole face of core 60, thus driving rotor 88 clockwise to its other at-rest position, with South corner 92 near core 59 and North corner 90 near core 60; in this other at-rest rotor position, the residual or at-rest flux distribution will be understood to be the exact opposite of that applying to the position shown in FIG. 15.

In FIGS. 16 and 17, we show a still further modified switch arrangement incorporated in the stator body 51 and utilizing an annulus 95 (rotatable on hub 50) as the movable switch element. The annulus 95 may also be of injection-molded plastic and has a central bore 96 with limit angular cut-outs or lobes 97 at diametrically opposite locations. A key pin 98 through hub 50 has like projecting ends which extend into both lobes 97 to determine limits of angular lost motion in the relation between rotor rotation and driven rotation of switch member 95. The annulus is neatly retained within the cavity of body 51 (when capped by member 54, not shown in FIGS. 16–17) and while thus retained, a conducting part 95' of its periphery is either in shorting contact with a first set of switch contacts, suggested at 99, or with a second set of switch contacts, suggested at 99'. The magnet rotor may be of the two-pole variety of FIG. 15 or of the four-pole variety of FIGS. 2–6, as suggested by N-S legends. Plural contacts on the alignment 99 may be separate resilient wires carried by the body 51 and having stressed cantilevered application to the periphery of switch member 95, with external connecting-lug access as at 100; plural contacts 99' for the other rotor position may be similarly supported, with external connecting-lug access as at 100'.

It will be seen that we have described improved indicator mechanism of the character indicated, with its own self-contained switching means to reverse the excitation of the windings. Permanently polarized circuit, requiring no external actuation, retain the at-rest positions, and the polarity required for such retention is the same as that developed by excitation to drive the rotor to its changed at-rest position. All torques are developed symmetrically about the rotor axis, without generating residual radial loading on the rotor pivot connections. Lost motions enable optimized minimums of starting torques, resulting in improved reliability of operation, even under adverse field conditions of use. Friction is reduced by using self-lubricating plastic at various bearings and by utilizing transversely related pivot axes for rotor 46 and indicator 16 to minimize lateral displacement due to angularity in link 34 as it moves between its at-rest positions.

While the invention has been described in detail for the forms shown, it will be understood that modifications may be made without departing from the invention as defined in the claims.

What is claimed is:

1. An electromagnetic visual-display device for selectively displaying alternative visual signals, comprising a frame, a display member pivotally mounted to said frame and including plural visual indicia at spaced angular locations about the pivot axis, a permanent-magnet member pivotally mounted to said frame at a location spaced from said display member, a ferromagnetic core having a gap region in which said magnet is pivotally movable, winding means linked to said core, voltage-supply connections to said winding means including polarity-reversing switch means having a frame-mounted element and a coacting movable element carried by one of said members, frame-based limit-stop means for limiting the pivotal arc of movement of said magnet in one direction for a first switched excitation of said winding means and in the opposite direction for a second switched excitation of said winding means, and means including a lost-motion link connection between off-axis points on said members, whereby for any given excitation of said winding means the full inertia load of said display member is not presented to the torque output of said magnet member until after initial lost-motion displacement.

2. A display device according to claim 1, in which the off-axis connection to said magnet member is at a greater radius than that of said display member, whereby the angular displacement of said display member may exceed the angular displacement of said magnet member upon excitation of said winding means.

3. A display device according to claim 1, in which said magnet member includes a radially extending crank arm, said limit-stop means comprising two stops spanning the movement of said arm, said link connection having a lost-motion relation with said crank arm.

4. A display device according to claim 3, in which abutment means forming part of said link connection intercepts the respective stops.

5. A display device according to claim 4, in which said abutment means, at intercept with each of said stops, retains said arm in clearance with said stops.

6. A display device according to claim 3, in which one of said stops is a frame-based frictionally retained pin with an eccentric head and means for angularly adjusting the same to provide corresponding adjustment of the effective location of said one stop.

7. A display device according to claim 1, in which the pivot axes extend in substantially perpendicular directions at their offset spacing, said frame including means guiding the reciprocating movement of said link connection in a direction substantially perpendicular to spaced planes which respectively include both said pivot axes.

8. A display device according to claim 7, in which the off-axis link-connection point on said display member is an elongated bore parallel to the pivot axis thereof, and in which the related end of said link connection includes a pin locating in said bore.

9. A display device according to claim 8, in which said bore includes a counterbore near the pin-entry end thereof, said pin extending into said bore beyond the depth of said counterbore.

10. A display device according to claim 8, in which said bore includes a conically tapering profile which widens at the pin-entry end thereof, said pin extending into the narrow end of said bore.

11. A display device according to claim 8, in which said link connection includes a single elongated rod and in which said pin is a bent end of said rod.

12. A display device according to claim 1, in which the movable element of said switch means includes a part carried by said magnet member.

13. A display device according to claim 1, in which the movable element of said switch means includes a part carried by said display member.

14. A display device according to claim 13, in which said movable switch element is pivotally mounted on the axis of said display member, and in which said display member and said movable switch element have coacting abutments determining a limited angular lost-motion reversible driving engagement of said display member to said movable switch element.

15. A display device according to claim 12, in which the part of said frame which pivotally supports said rotor is a stator body circumferentially enveloping said rotor, said switch means including an arm pivoted in the stator body, and a lost-motion connection between said arm and a point on said rotor offset from the rotor-pivot axis.

16. A display device according to claim 15, in which said arm is pivotally supported on an axis offset from the rotor-pivot axis, the lost-motion connection between said rotor and arm being intermediate the rotor-pivot axis and the arm-pivot axis.

17. A display device according to claim 12, in which the part of said frame which pivotally supports said rotor is a stator body circumferentially enveloping said rotor, the pivotal support of said rotor including a shaft portion, said switch means including a washer rotatable on said shaft portion, and a rotary lost-motion connection between said shaft portion and said washer.

18. In an electromagnetic visual-display device for selectively displaying alternative visual signals, an elongated frame including a rectangular course of ferromagnetic material, a stator supported centrally of said frame and between the two long legs of said course, a rotor including a permanent magnet pivotally carried by and within said stator on a pivot axis transverse to the elongation of said frame, said rotor including a crank arm projecting externally of said stator for a limited swing of angular movement thereof, separate ferromagnetic core elements secured to the respective short legs of said course and projecting toward each other in clearance relation with said rotor magnet, electric windings linked to said core elements and contained within the span between the long legs of the course, said frame further including a support projecting longitudinally of one end of said frame, a display member pivotally mounted to said support in longitudinally offset relation to said course and on an axis transverse to the elongation of said frame, and a lost-motion link connection from said arm to said display member at a point offset from the pivot axis thereof.

19. A display device according to claim 18, in which said pivot axes extend generally transversely of each other, in which said link connection is a single elongated rod, and in which said frame includes guide means for said rod at a location intermediate the ends of said rod.

20. A display device according to claim 18, in which said rotor is permanently magnetized with two pairs of poles alternating in polarity at substantially uniform angular spacings about the rotor-pivot axis, and in which said windings are so linked to said core elements as to produce a first direction of core flux polarity toward said rotor for a first polarity of excitation and to produce a second direction of core-flux polarity away from said rotor for winding excitation of opposite polarity.

21. A display device according to claim 18, in which said rotor is permanently magnetized along a diametrically extending alignment with respect to the rotor-pivot axis; said windings being so linked to said core elements as, for a first polarity of winding excitation, to produce a first direction of core-flux polarity in one core toward said rotor and in the other core away from said rotor, and to reverse such core-flux polarities for winding excitation of opposite polarity.

References Cited

UNITED STATES PATENTS 2,866,965   12/1958   Houdek, Jr., et al __ 340—373X

HAROLD I. PITTS, Primary Examiner

U.S. Cl. X.R.

340—324, 366, 378